(12) United States Patent
Townley et al.

(10) Patent No.: US 11,904,235 B2
(45) Date of Patent: Feb. 20, 2024

(54) VIDEO GAMING SYSTEM

(71) Applicant: T2M, LLC, Golden Valley, MN (US)

(72) Inventors: Fraser Townley, Pembroke (MA); Lee Chin Feng, New Taipei (TW); Daniel Paul Dooley, Oklahoma City, OK (US)

(73) Assignee: T2M, INC., Golden Valley, MN (US)

( * ) Notice: Subject to any disclaimer, the term of this patent is extended or adjusted under 35 U.S.C. 154(b) by 0 days.

(21) Appl. No.: 17/383,759

(22) Filed: Jul. 23, 2021

(65) Prior Publication Data

US 2023/0024322 A1  Jan. 26, 2023

(51) Int. Cl.
*A63F 13/24* (2014.01)

(52) U.S. Cl.
CPC .................... *A63F 13/24* (2014.09)

(58) Field of Classification Search
CPC .............. A63F 13/98; A63F 2250/49
See application file for complete search history.

(56) References Cited

U.S. PATENT DOCUMENTS

| | | | |
|---|---|---|---|
| 7,833,097 B1 | 11/2010 | Maddox et al. | |
| 8,529,357 B2* | 9/2013 | Joynes ................ | G06F 3/0219 463/47 |
| 9,407,100 B2 | 8/2016 | Joynes et al. | |
| 9,539,507 B2 | 1/2017 | Schoenith et al. | |
| 2007/0178966 A1* | 8/2007 | Pohlman ................ | A63F 13/06 463/36 |
| 2013/0184077 A1* | 7/2013 | Galpern ................ | A63F 13/24 463/37 |
| 2013/0341214 A1* | 12/2013 | King ...................... | A63F 13/98 206/216 |
| 2014/0274394 A1* | 9/2014 | Willis .................... | A63F 13/24 463/37 |
| 2015/0018101 A1* | 1/2015 | Schoenith ............. | A63F 13/98 463/37 |

(Continued)

FOREIGN PATENT DOCUMENTS

| | | |
|---|---|---|
| CN | 107008005 | 8/2017 |
| CN | 207462637 | 6/2018 |

(Continued)

OTHER PUBLICATIONS https://www.amazon.com/Version-GameSir-Gamepad-Controller-PlayStation-one/dp/B08RJ2NWQ7, accessed Jul. 11, 201 (screenshots provided as NPL 1).

(Continued)

*Primary Examiner* — David L Lewis
*Assistant Examiner* — Shauna-Kay Hall
(74) *Attorney, Agent, or Firm* — Fletcher Yoder, P.C.

(57) ABSTRACT

A video gaming system that preferable includes computing device interacting electronically with a video game controller, the video game controller in electronic communication with the computing device. Preferably, the computing device includes an electronic video game loaded on to a processor of the computing device when the video gaming system is configured to play a video game. Input signals, generated by the video game controller in response to an input action provided by a user of the video gaming system, cause a visual or audio response by the electronic video game, which is displayed on a display associated with the computing device or delivered by way of a speaker associated with the computing device.

3 Claims, 13 Drawing Sheets

(56) References Cited

U.S. PATENT DOCUMENTS

2015/0149668 A1* 5/2015 Joynes ................. G06F 3/0219
710/62

FOREIGN PATENT DOCUMENTS

| CN | 207722356 | 8/2018 |
| WO | 2021133276 | 7/2021 |
| WO | 022067344 | 3/2022 |
| WO | 2022067344 | 3/2022 |

OTHER PUBLICATIONS https://www.youtube.com/watch?v=q-SK-mt2WBM, accessed Jun. 23, 2021 (screenshots provided as NPL 2).
https://www.amazon.com/Wireless-Controller-Vibration-Compatible-10%EF%BC%88Black%EF%BC%89/dp/B08XYWC1R4, accessed Jul. 11, 2021 (screenshots provided as NPL 3).
PCT Application No. PCT/US2022/037750 International Search Report and Written Opinion, dated Nov. 1, 2022, 13, pgs.

* cited by examiner

VIDEO GAMING SYSTEM

BACKGROUND

The present invention is broadly concerned with gaming systems, and more particularly, mobile video gaming systems. As improvement in telecommunication technologies continue to progress, there has been a shift in how users utilize their computing devices, and particularly how users utilize their smart phones. Historically, users have enjoyed playing video games on either specialized, limited purpose counsel gaming systems, or personal computers. In either case, lack of mobility of these systems has been a drawback, i.e. an inability to enjoy playing video games selected from thousands of available video games anytime and anywhere has not been an option. With the advancements in telecommunication and Wi-Fi enabled mobile computing devices with enhanced computing power, such as smart phones, and increased bandwidth in wireless phone services, there has been a shift in the video gaming industry from fixed location gaming to mobile gaming. As this shift has occurred, a demand for improved characteristics of mobile video game controllers has emerged, most particularly, improvements in ergonomics and controller/computer interface capabilities. It is to these needs the present invention is directed.

DETAILED DESCRIPTION

The present disclosure generally relates to a video gaming system, which utilizes a video game controller in electronic communication with a computing device. Preferably, the computing device includes an electronic video game loaded on to a processor of the computing device when the video gaming system is configured to play a video game. As those skilled in the art further clearly recognize that input signals, generated by the video game controller, in response to an input action provided by a user of the video gaming system, causes a visual or audio response by the electronic video game, which is displayed on a display associated with the computing device or delivered by way of a speaker associated with the computing device. Accordingly, it is inherent that an operational video gaming system operates by way of a video game software program loaded into a memory portion of the computing device that interacts with the processor of the computing device. Further, for most video gaming systems, the video game controller preferably includes a processor, which manages the functions of the video game controller and interfaces with the processor of the computing device.

Figure 1:
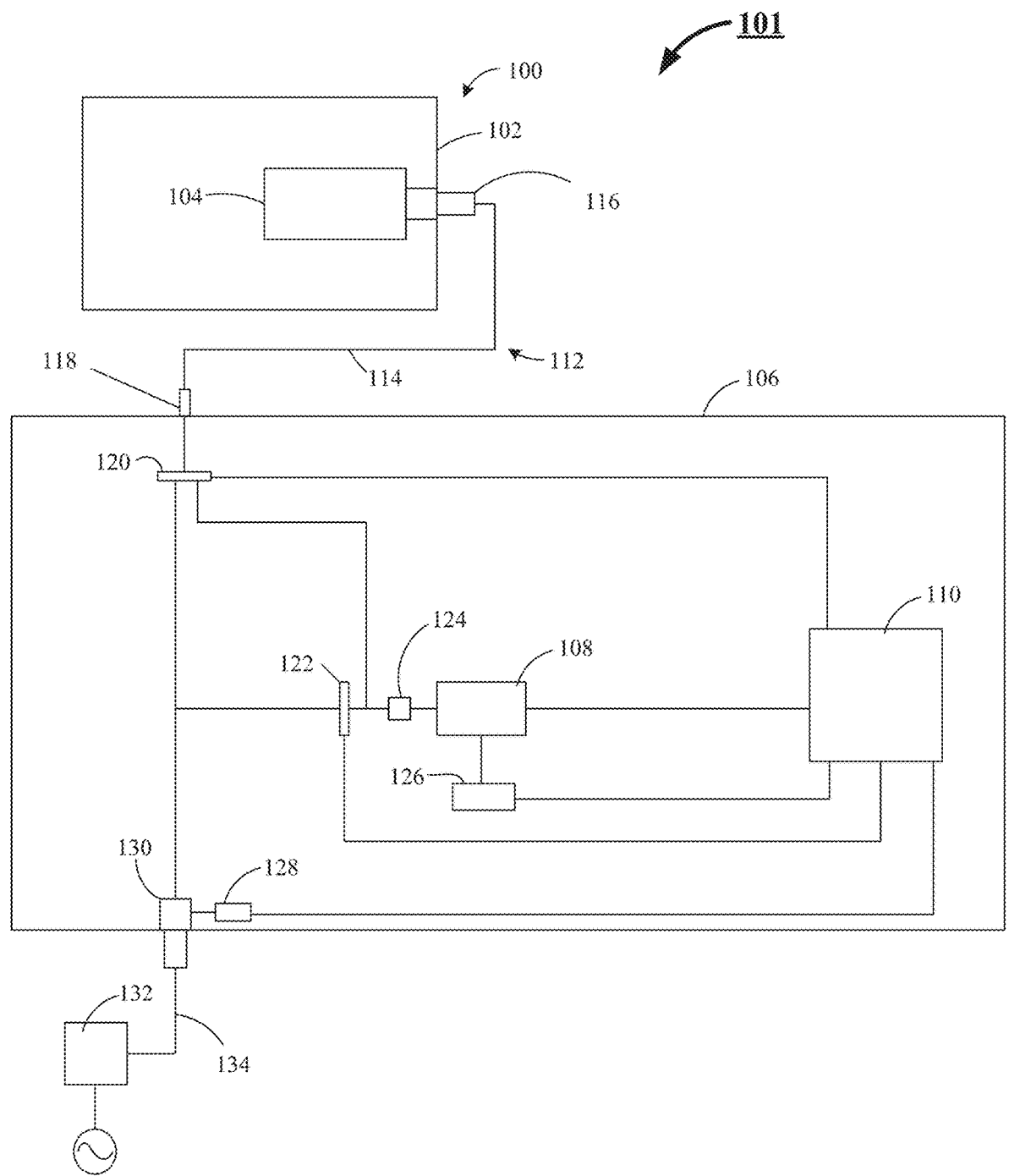
FIG. 1 is a block diagram of an embodiment of a video gaming system.

Turning to the drawings. FIG. 1 shows a power management and power pass through circuit 100 ("PMPP") of a first embodiment of a video gaming system 101. Said video gaming system 101, includes at least, but is not limited to, a computing device 102, which provides at least a first energy storage device 104. The computing device 102 communicates with a video game controller 106, said video game controller 106 provides at least, but is not limited to, a second energy storage device 108 and a processor 110. Said PMPP 100 precludes a simultaneous bidirectional current flow between said computing device 102 and said video game controller 106.

In a preferred embodiment, the communication between the computing device 102 and the video game controller 106 is achieved via a wired connection circuit 112, however as one skilled in the art understands, communication between the computing device 102 and the video game controller 106 may be achieved wirelessly. The wired connection circuit 112 preferably includes a power and signal cable 114 (also referred to herein as cable 114). Cable 114 preferably provides a connector 116, which is specifically configured to interface with an interface connector 118, said interface connector 118 provides a predetermined number of contacts including, but not limited to, a power contact and a ground contact.

As further shown by FIG. 1, the video game controller 106 further provides at least, but not by way of a limitation: a first current flow control circuit 120; a second current flow control circuit 122; a unidirectional current flow circuit 124; a battery charge control circuit 126 (battery charge control device); a voltage present detection circuit 128; and an interface connector 130. In a preferred embodiment, said interface connector 130 presents a structurally similar structure to the interface connector 118. The PMPP 100 still further preferably includes a computing device charger 132, and a charge cord 134. In a preferred embodiment, during operation of the video gaming system 101, the first energy storage device 104 is connected in parallel with the second energy storage device 108 of the video game controller 106. The first energy storage device 104 and the second energy storage device 108 of the video game controller 106 are of a common voltage but are typically of different capacities.

Further in a preferred operating mode, when the computing device 102 is activated and no voltage is detected by the voltage present detection circuit 128, the first current flow control circuit 120 is set to provide power from the first energy storage device 104 of the computing device 102 to the processor 110 by way of the unidirectional current flow circuit 124 and the second energy storage device 108.

While the second current flow control circuit 122 is set to preclude power passage from the computing device charger 132 to the processor 110, when voltage is detected by the voltage present detection circuit 128, the first current flow control circuit 120 is set to preclude power from the first energy storage device 104 to the processor 110. The first energy storage device 104 is simultaneously set to receive power from the computing device charger 132 for charging the first energy storage device 104, which in a preferred embodiment is, but not by limitation, a battery. While the first energy storage device 104 is being charged, the second energy storage device 108, provides power to the processor 110 and the second current flow control circuit 122 is set to preclude power passage from the computing device charger 132 to the second energy storage device 108. However, during a charge cycle of the first energy storage device 104, and when the battery charge control circuit 126 detects the charge level of the second energy storage device 108 to be at a predetermined low threshold value, for example, below a threshold value as a set value, the battery charge control circuit 126 signals the processor 110, which in turn signals the second current flow control circuit 122 to change state from precluding power transfer from the computing device charger 132 to the second energy storage device 108, to enabling power transfer from the computing device charger 132 to the second energy storage device 108.

During the charge process of the second energy storage device 108, when the battery charge control circuit 126 detects the charge level of the second energy storage device 108 to be at a predetermined high threshold, for example, above a threshold value as a set value (which may differ from and be higher than the predetermined low threshold), the battery charge control circuit 126 signals the processor 110, which in turn signals the second current flow control circuit 122 to change state from enabling power transfer from the computing device charger 132 to the second energy storage device 108 to precluding power transfer from the computing device charger 132 to the second energy storage device 108. In a preferred embodiment, the unidirectional current flow circuit 124 precludes passage of current from the second energy storage device 108 to the first energy storage device 104. It is known by those skilled in the art that a specifically designed Zener Diode will fulfill this task by preventing voltage of said second energy storage device 108 (such as a battery or specialized capacitor) from being conducted to either said first energy storage device 104 or said interface connector 130. As will be appreciated by those skilled in the art, at least a portion of the functions being carried out by the PMPP circuit 100 described hereinabove may be carried out through the use of an ASIC (application specific integrated circuit), programed to carry out the functions disclosed herein above, and interacting with processor 110.

Figure 2:
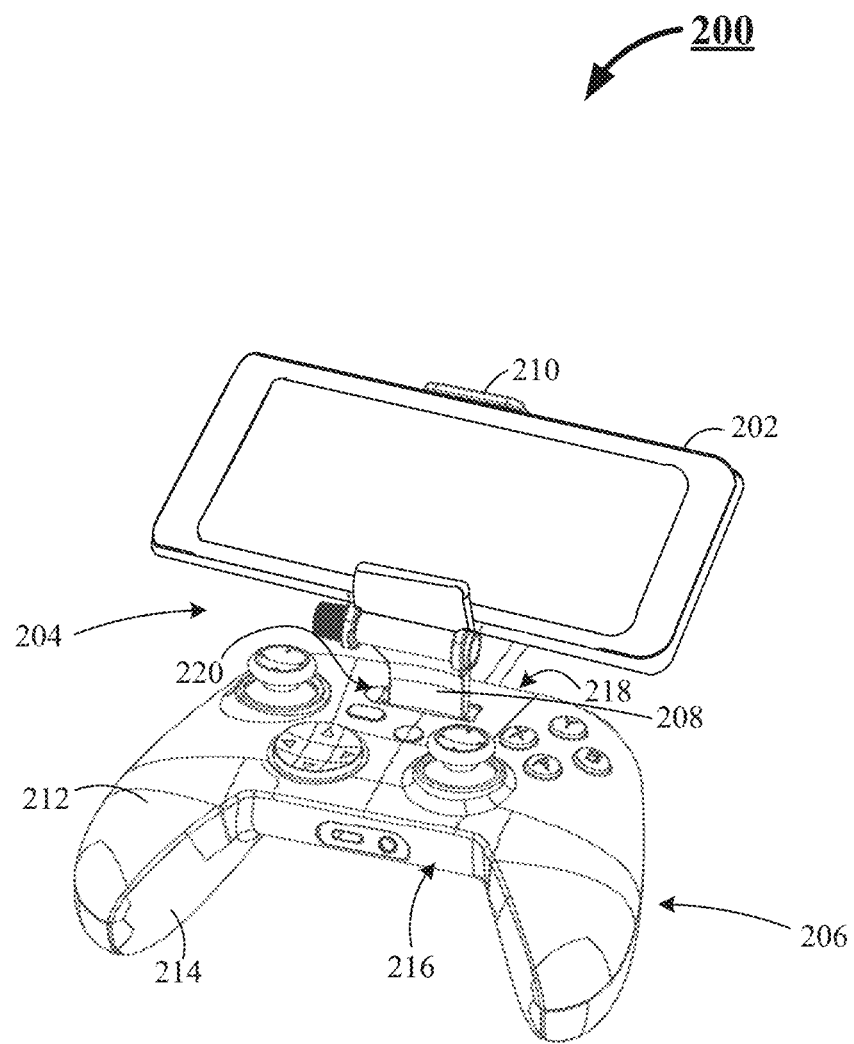
FIG. 2 shows a perspective view of a second embodiment of the video gaming system.

FIG. 2 shows a perspective view of a second embodiment of the video gaming system 200. The video gaming system 200 preferably includes at least a computing device 202 supported by a stand 204 above a video game controller 206. In a preferred embodiment the stand 204 includes a support portion 208 linked to a cradle portion 210. The cradle portion 210 confines and secures the computing device 202 during a user's operation of the video gaming system 200.

The video game controller 206 is in electronic communication with said computing device 202, and includes at least, but is not limited to, a cover portion 212 and a base portion 214. The cover portion 212 when secured to the base portion 214 forms a video game controller housing 216 (also referred to herein as controller housing 216). The cover portion 212 provides a front edge 218, and an aperture 220 offset from the front edge 218.

Figure 3:
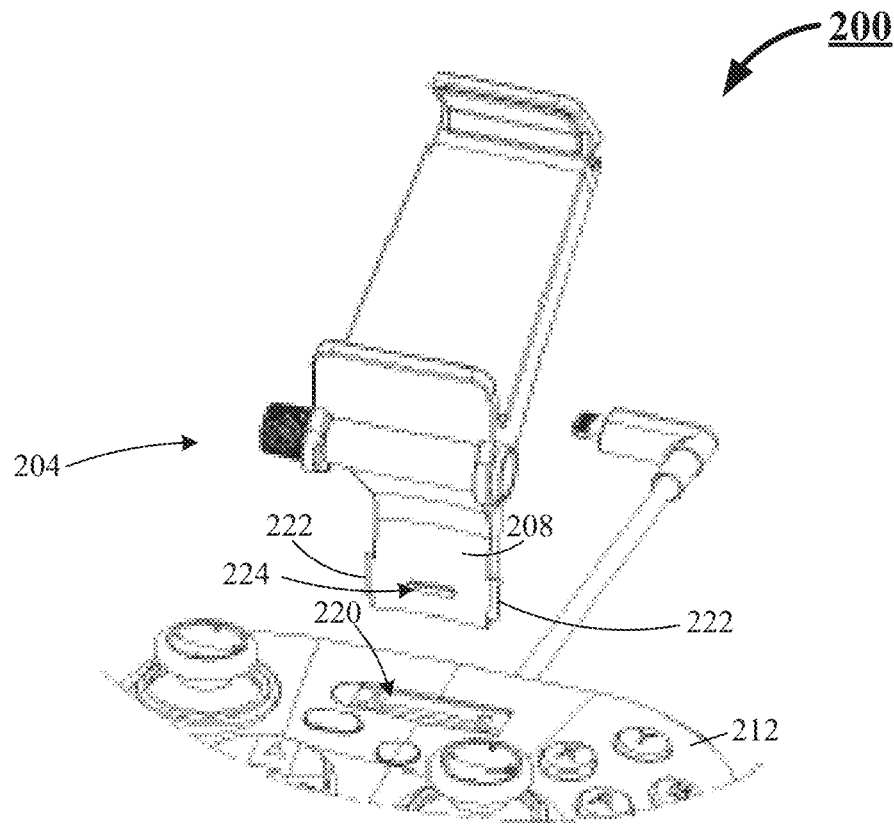
FIG. 3 illustrates a partial cutaway top perspective view of the second embodiment of the video gaming system of FIG. 2, constructed in accordance with various embodiments disclosed and claimed herein.
Figure 5:
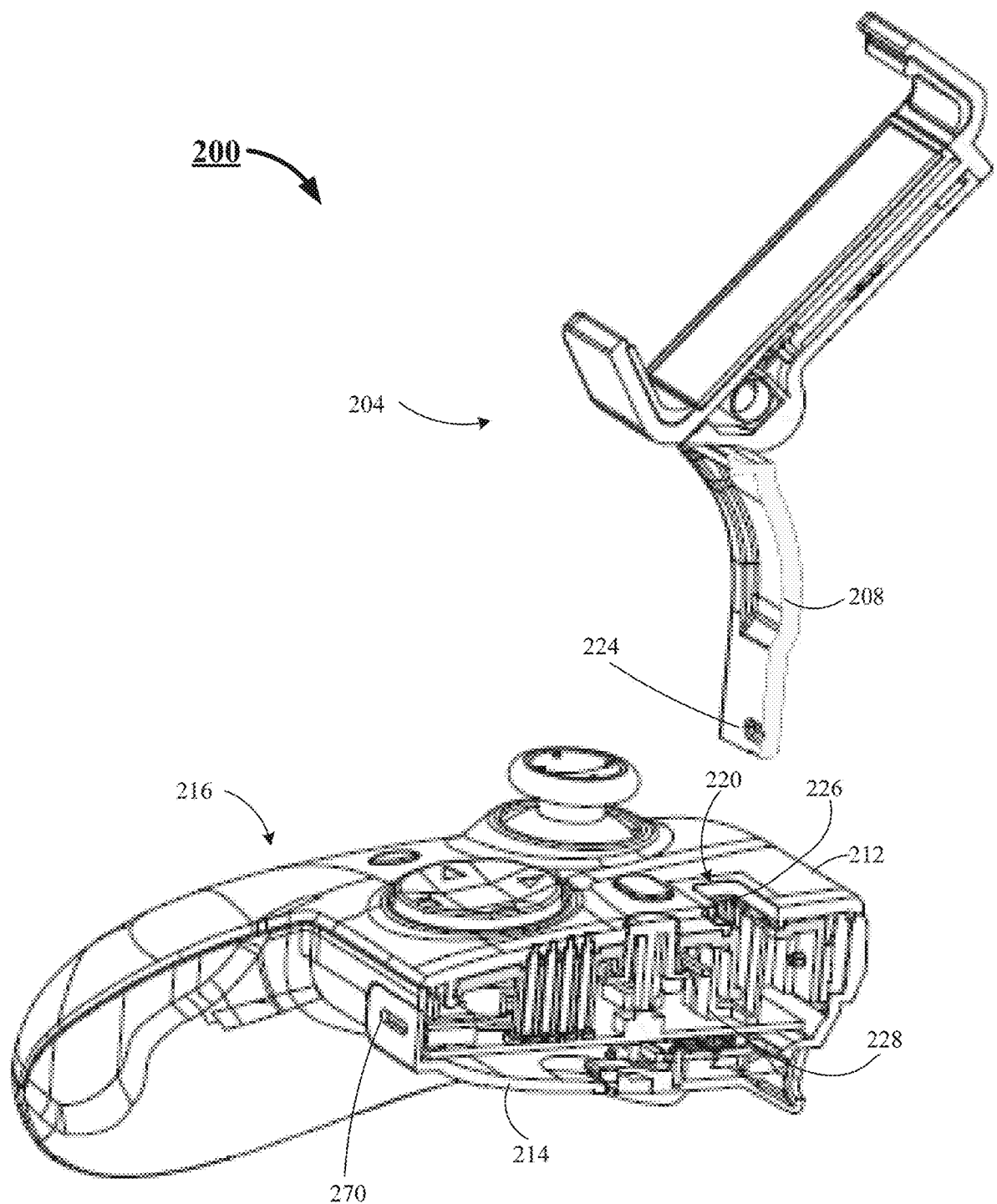
FIG. 5 shows a left-side partial cutaway view in elevation of the second embodiment of the video gaming system of FIG. 2.

FIG. 3 shows the support portion 208 of the stand 204 further preferable provides a boss 222 and a pocket 224. In this preferred embodiment, and as additionally shown by FIG. 5, the aperture 220 is configured to confine and promote passage of the support portion 208 through the cover portion 212. And as shown by FIG. 5, the base portion 214 provides a retention pocket 226 and a retention boss 228. Boss 222 (of FIG. 3) interacts with retention pocket 226, the interaction between boss 222 and retention pocket 226 constrains the support portion 208, within the aperture 220. The interaction of pocket 224 and retention boss 228, mitigates an inadvertent removal of the support portion 208 from aperture 220. It is noted that in this second embodiment of the video gaming system 200, the stand 204 is removably secured to the video game controller housing 216 absent the use of hardware, that is the stand 204 is manually pushed into the aperture 220 to install the stand 204 to the video game controller housing 216, and manually pulled out of the aperture 220 to uninstall the stand 204 from the video game controller housing 216.

Figure 4:
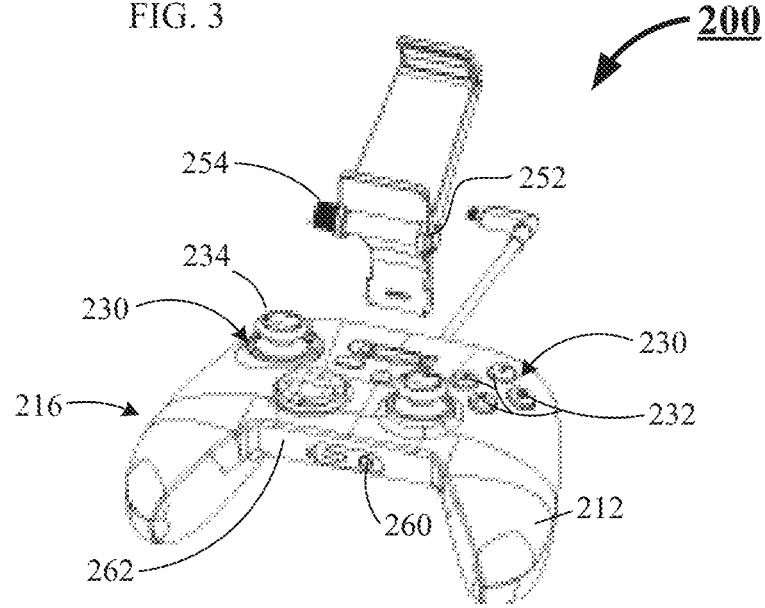
FIG. 4 is a top perspective view of the second embodiment of the video gaming system of FIG. 2.

FIG. 4 further shows a top perspective view of the video gaming system 200, in which the cover portion 212, provides a plurality of input button apertures 230 which facilitates an interaction by the user with a plurality of input buttons 232 and a joystick 234. Each input button 232 is confined by its corresponding input button aperture 230, and the joystick 234 is confined by its corresponding input button aperture 230.

Figure 7:
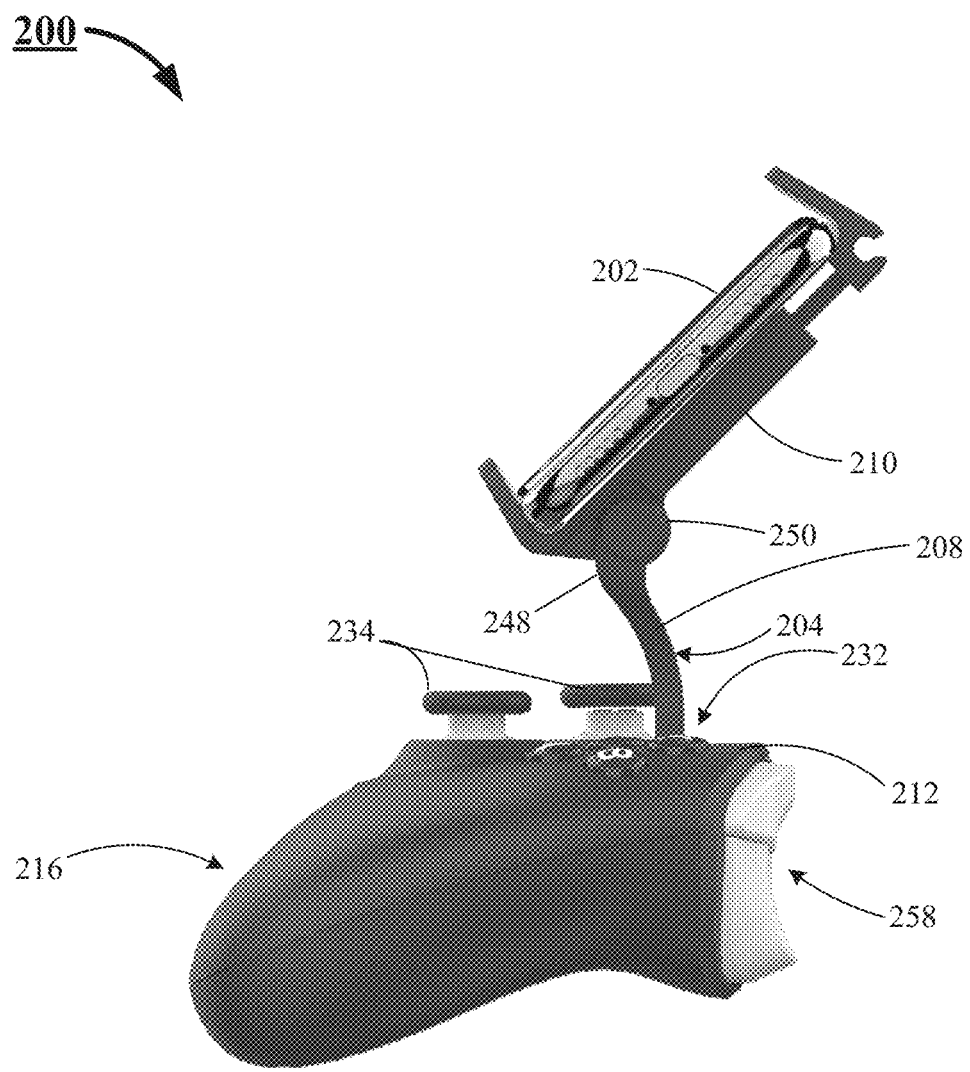
FIG. 7 displays a right-side view in elevation of the second embodiment of the video gaming system of FIG. 2.
Figure 8:
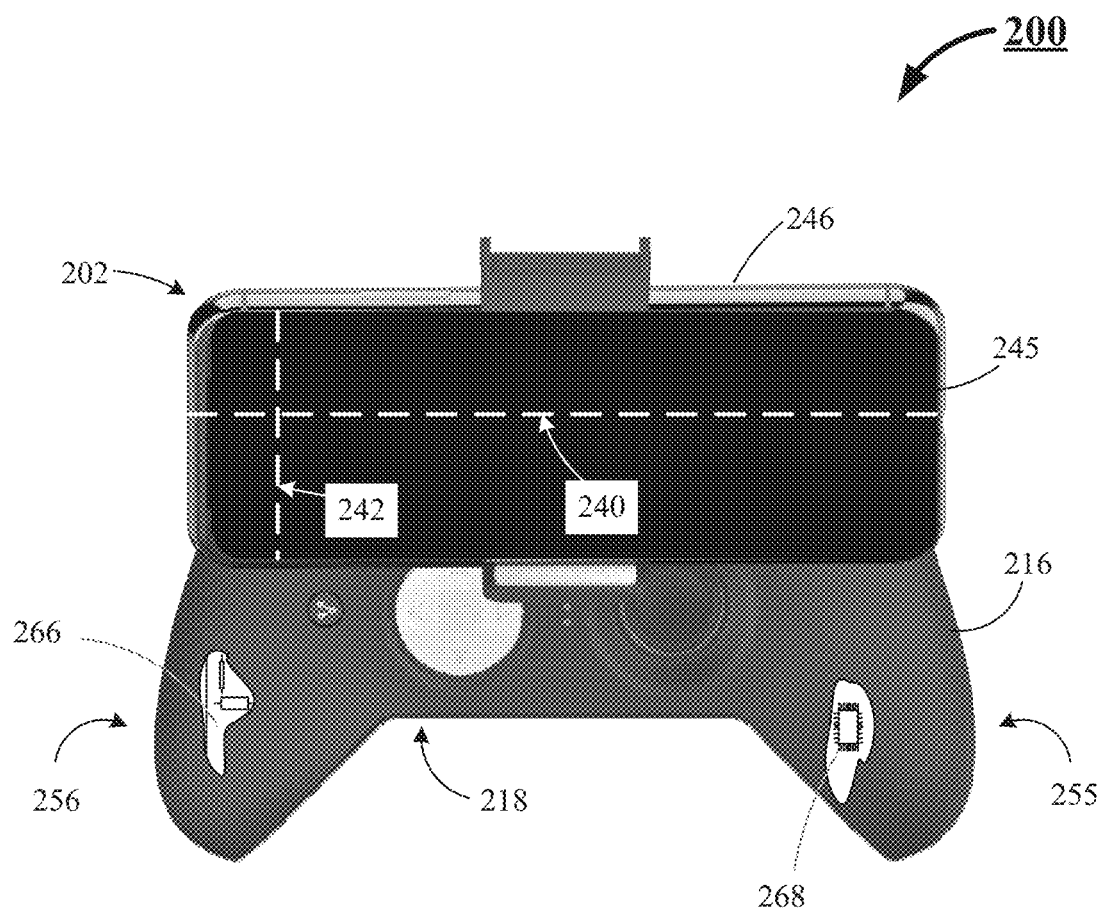
FIG. 8 depicts a top plan view of the second embodiment of the video gaming system of FIG. 2.

As shown by FIG. 7, when the computing device 202 is confined by the cradle portion 210, and the stand 204 is secured by the controller housing 216, the computing device 202 overhangs at least a portion of the cover portion 212 and visually obscures a number of the plurality of input buttons 232 and the joystick 234, when the user is viewing the (mobile) video gaming system 200 from a top plan view vantage point as shown by FIG. 8.

FIG. 8 further shows the computing device 202 has a length 240, greater than its width 242, and a display screen 245 secured to a back 246, and in which the stand 204 (of FIG. 7) is manually removably secured to the controller housing 216 upon full engagement of the support portion within the aperture 220 (of FIG. 4).

Returning to FIG. 7, the support portion 208 provides a hinge member 248, which corresponds to, and is in contact adjacency with, a hinge member 250 of the cradle portion 210. The corresponding hinge members (248 & 250) are linked one to the other by way if a hinge pin 252 (of FIG. 4). The hinge pin 252 promotes an articulation of the cradle portion 210 relative to the support portion 208. The hinge pin 252 interacts with provided mechanical hardware 254 (of FIG. 4) such that when a desired angle between said support portion 208 and said cradle portion 210 is selected, the mechanical hardware 254 is engaged to maintain said desired angle between the support portion 208 and the cradle portion 210. As further shown by FIG. 8, the controller housing 216 provides both right-side and left-side input module portions (255 & 256 respectively). Each of the input module portions (255 & 256) hosts, as shown by FIG. 7, a plurality of input mechanisms including, but not limited to, input buttons 232, joysticks 234, and triggers 258.

Figure 6:
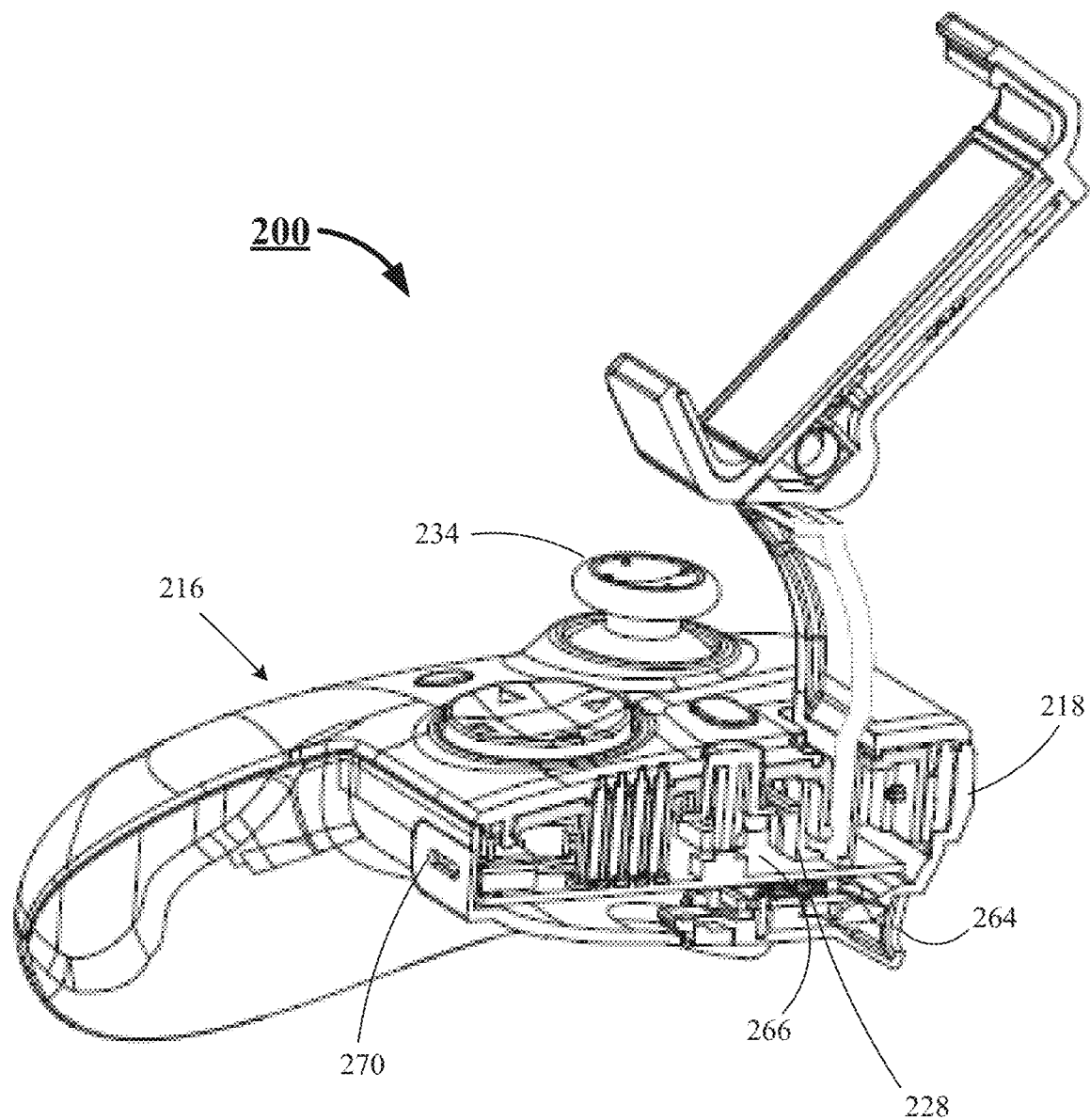
FIG. 6 displays a left-side partial cutaway view in elevation of the second embodiment of the video gaming system of FIG. 2.

Returning to FIG. 4, illustrated is an audio signal input/output port 260 arranged at a transversal portion 262 of said controller housing 216, said audio signal input/output port 260 is separate and distinct from a combined power input and audio signal input/output port 264 (of FIG. 6) positioned on said front edge 218 (of FIG. 6).

Additionally, FIG. 6 shows a printed circuit board assembly 266. The printed circuit board assembly 266 is housed within the controller housing 216. In this preferred embodiment, the printed circuit board assembly 266 (of FIG. 8) provides a gaming processor 268 (of FIG. 8). The gaming processor 268 is in electrical communication with: the plurality of input buttons 232 (of FIG. 4) the joystick 234; the audio signal input/output port 260 (of FIG. 4); and the power input port 270 (of FIG. 5). The printed circuit board assembly 266 further includes a power management and power pass through circuit 100 (of FIG. 1), said power management and power pass through circuit 100 communicating with said power input port 270.

Figure 9:
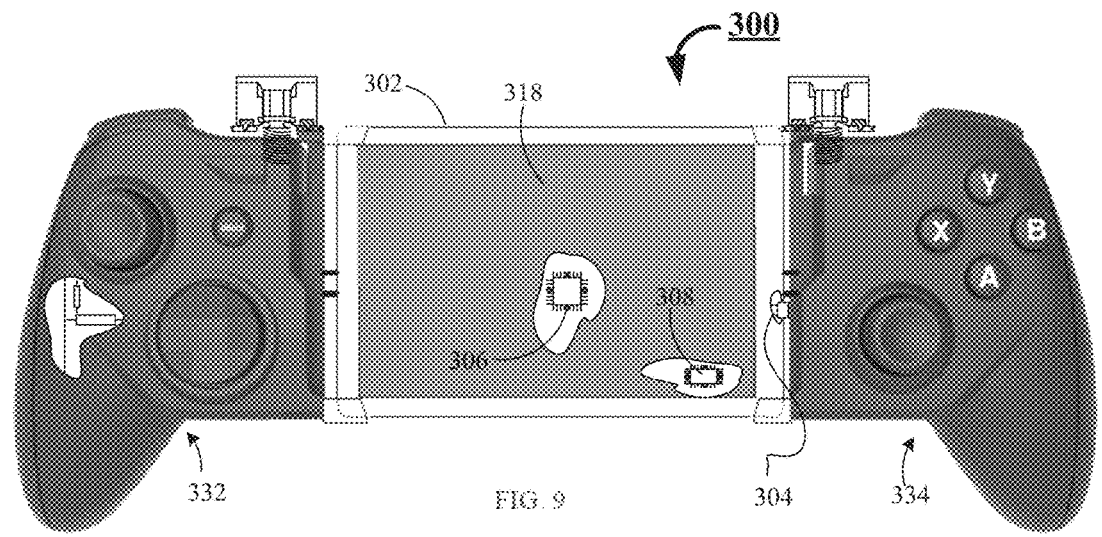
FIG. 9 depicts a plan view of a third embodiment of the video gaming system.

FIG. 9 shows a front view in elevation of a third embodiment of a (mobile) video gaming system 300. The video gaming system 300 includes, but is not limited to, a computing device 302. The computing device 302 provides at least a combined audio and data input/output port 304, as well as a processor 306, and a transceiver device 308. The processor 306 is in electrical communication with each the combined audio and data input/output port 304, and the transceiver device 308. The computing device 302 further provides a display screen 318, and a back cover 320 (of FIG. 11). The back cover 320, encloses the processor 306 and is secured to the display screen 318. The securement of back cover 320 to the display screen 318 forms an enclosed edge 322 (of FIG. 11) around a perimeter 324 (of FIG. 10) of the computing device 302. The perimeter 324 includes at least two opposing sides 326 & 328, respectfully, of FIG. 10.

Figure 10:
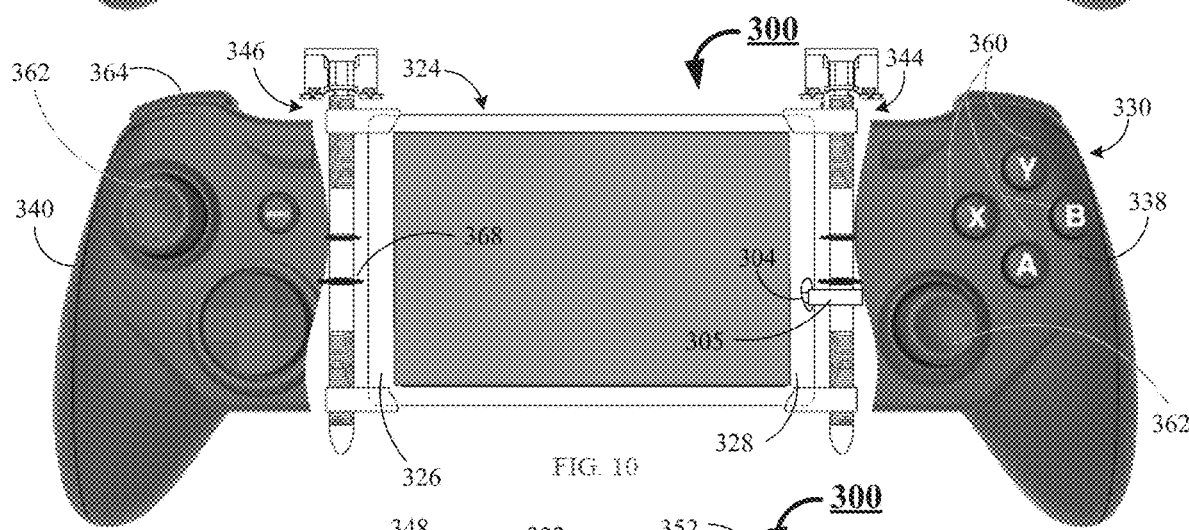
FIG. 10 illustrates a plan view of the third embodiment of the video gaming system of FIG. 9 depicting a partial cutaway revealing a clamp assembly of each of a pair of input modules of an electronic game control of the video gaming system of FIG. 9.

FIG. 10 additionally shows that the video gaming system 300, as preferably further including a bridgeless video game controller 330 in electronic communication with the processor 306 (of FIG. 9). In this preferred embodiment, the bridgeless video game controller 330 provides a pair of video game control modules 332 & 334 (of FIG. 9) respectfully. Each video game control module 332 or 334 is secured to a side of the two opposing sides 326 & 328, and each video game control module (332 or 334) is supported by the computing device 302, rather than the pair of video game control modules 332 & 334 supporting the computing device 302.

Figure 16:
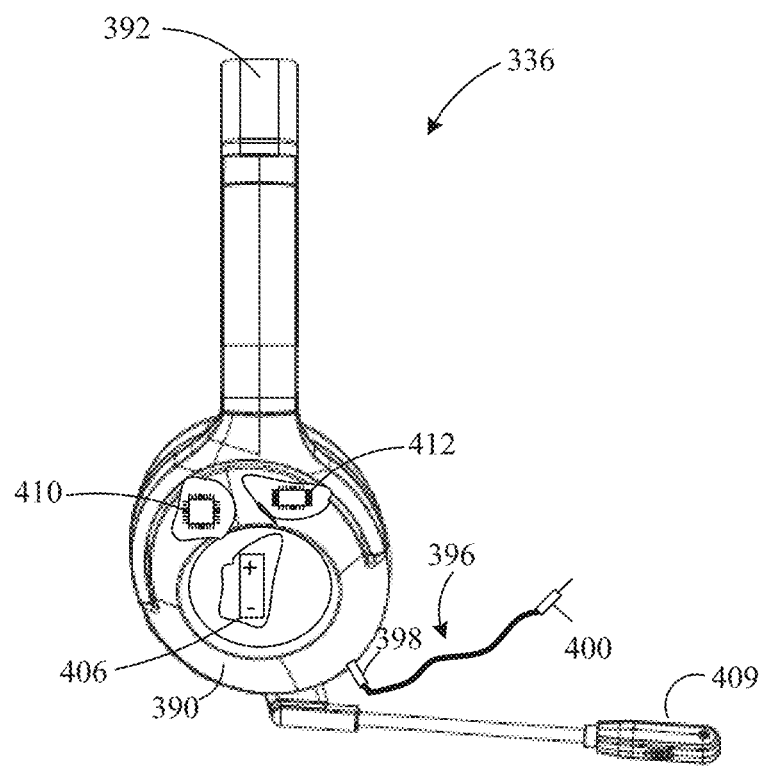
FIG. 16 shows a left-side elevation view of a gaming headset configured to interact with the third embodiment of the gaming system of FIG. 9.
Figure 17:
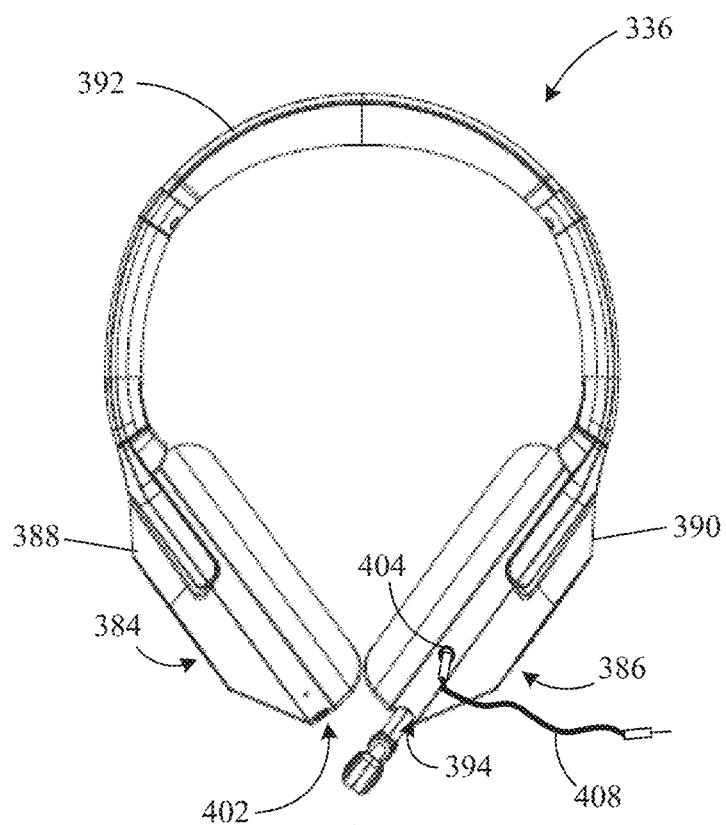
FIG. 17 shows a front view in elevation view of the gaming headset of FIG. 16, configured to interact with the third embodiment of the gaming system of FIG. 9.

The video gaming system 300, which preferably includes the bridgeless electronic video game controller 330 supported by the computing device 302, further includes and interacts with an audio headset 336 (of FIGS. 16 & 17). The bridgeless electronic video game controller 330 is in direct, wired electronic communication with the processor 306 by way of the combination audio and data input/output port 304 of said computing device 302, and a combination audio and data input/output port 305 of the bridgeless electronic video game controller 330.

Figure 11:
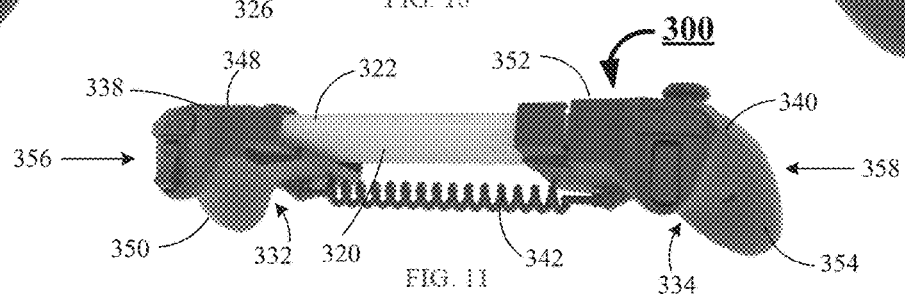
FIG. 11 shows a top perspective view of the third embodiment of the video gaming system of FIG. 9 depicting a power and data transfer cable communicating with each input module of the electronic video game controller of the third embodiment of the video gaming system of FIG. 9 constructed in accordance with various embodiments disclosed and claimed herein.

As shown by FIG. 11, the pair of video game control modules 332 & 334 of the bridgeless electronic video game controller 330 preferably includes at least a right-side input module portion 338, a left-side input module portion 340, and a tension free combination power and data communication cable 342 (also referred to herein as tension free cable 342). The tension free cable 342 is disposed between the right-side and left-side input module portions 338 & 340. The tension free cable 342 facilitates both data and power transfer between the right-side and left-side input module portions 338 & 340. In some embodiments, the tension free cable 342 does not provide structural support for either said right-side or said left-side input module portions 338 & 340.

As shown by FIG. 10, the bridgeless video game controller 330, utilizes a pair of clamp assemblies, i.e., a right-side clamp assembly 344 and a left-side clamp assembly 346. The right-side clamp assembly 344 is secured to and independently interacts with the right-side input module portion 338 while the left-side clamp assembly 346 is secured to and independently interacts with the left-side input module portion 340. The right-side and left-side clamp assemblies 344 & 346, in unison, cooperatively attach and secure the bridgeless electronic video game controller 330 to the computing device 302, wherein the computing device 302 provides all structural support for each the right-side input module portion 338 and said left-side input module portion 340 by way of the corresponding right-side clamp assembly 344 and left-side clamp assembly 346.

As further shown by FIG. 11, each right-side input module portion 338 and left-side input module portion 340 include at least, but are not limited to, a top enclosure (348 & 352) and a corresponding bottom enclosure (350 & 354), each top enclosure and a corresponding bottom enclosure join to form corresponding input module housing (356 & 358). As further shown by FIG. 10, the video gaming system 300, wherein the right-side and left-side input module portions 338 & 340 provide a plurality of input mechanisms including, but not limited to, buttons 360, joysticks 362, and triggers 364.

Figure 12:
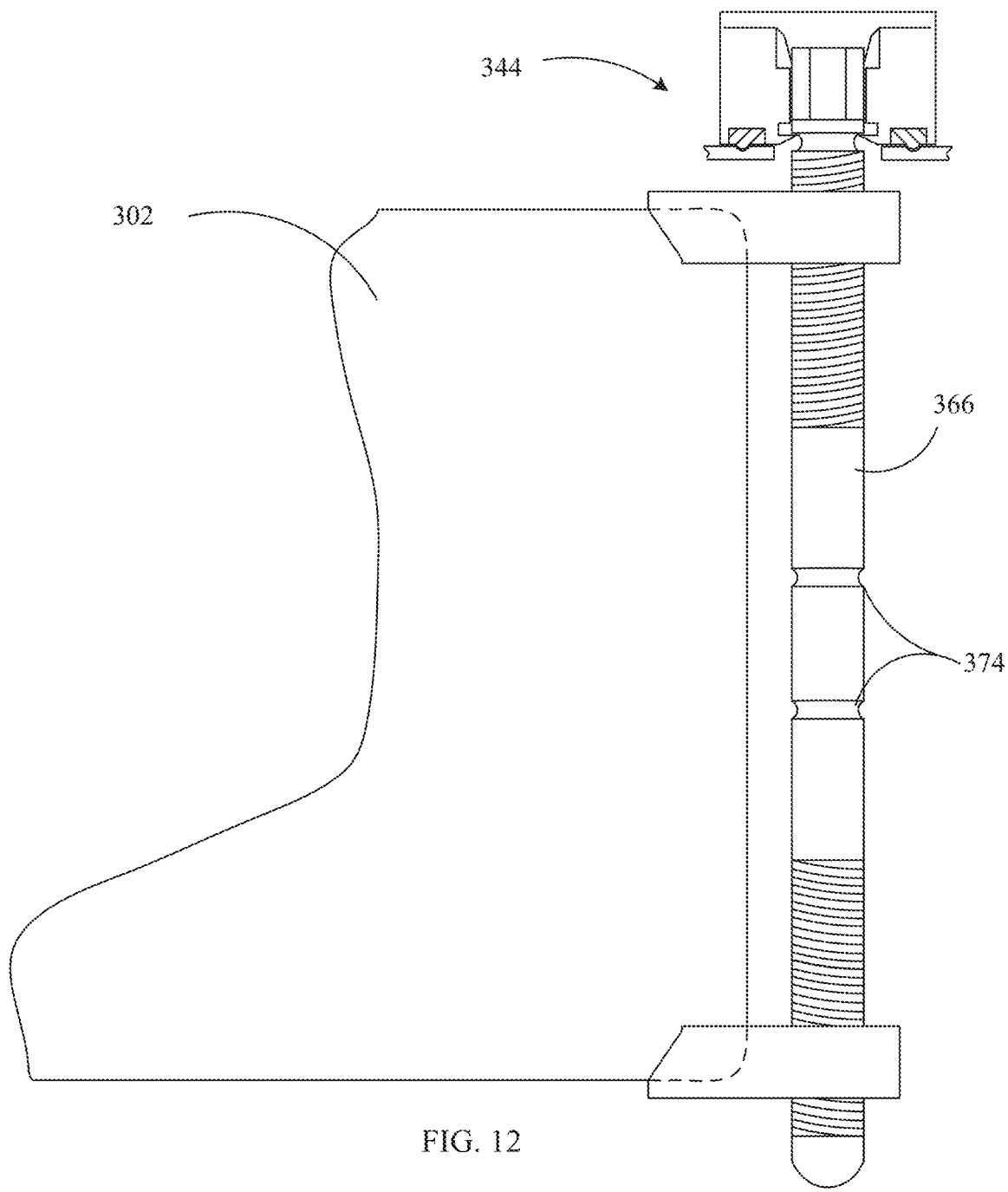
FIG. 12 displays a partial cutaway front view in elevation of the clamp assembly supported by the computing device of the third embodiment of the video gaming system of FIG. 9.
Figure 14:
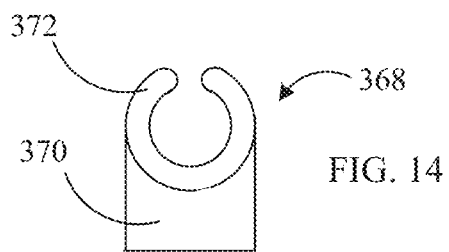
FIG. 14 shows a back plan view of a retention clip of the clamp assembly of the third embodiment of the video gaming system of FIG. 9.
Figure 15:
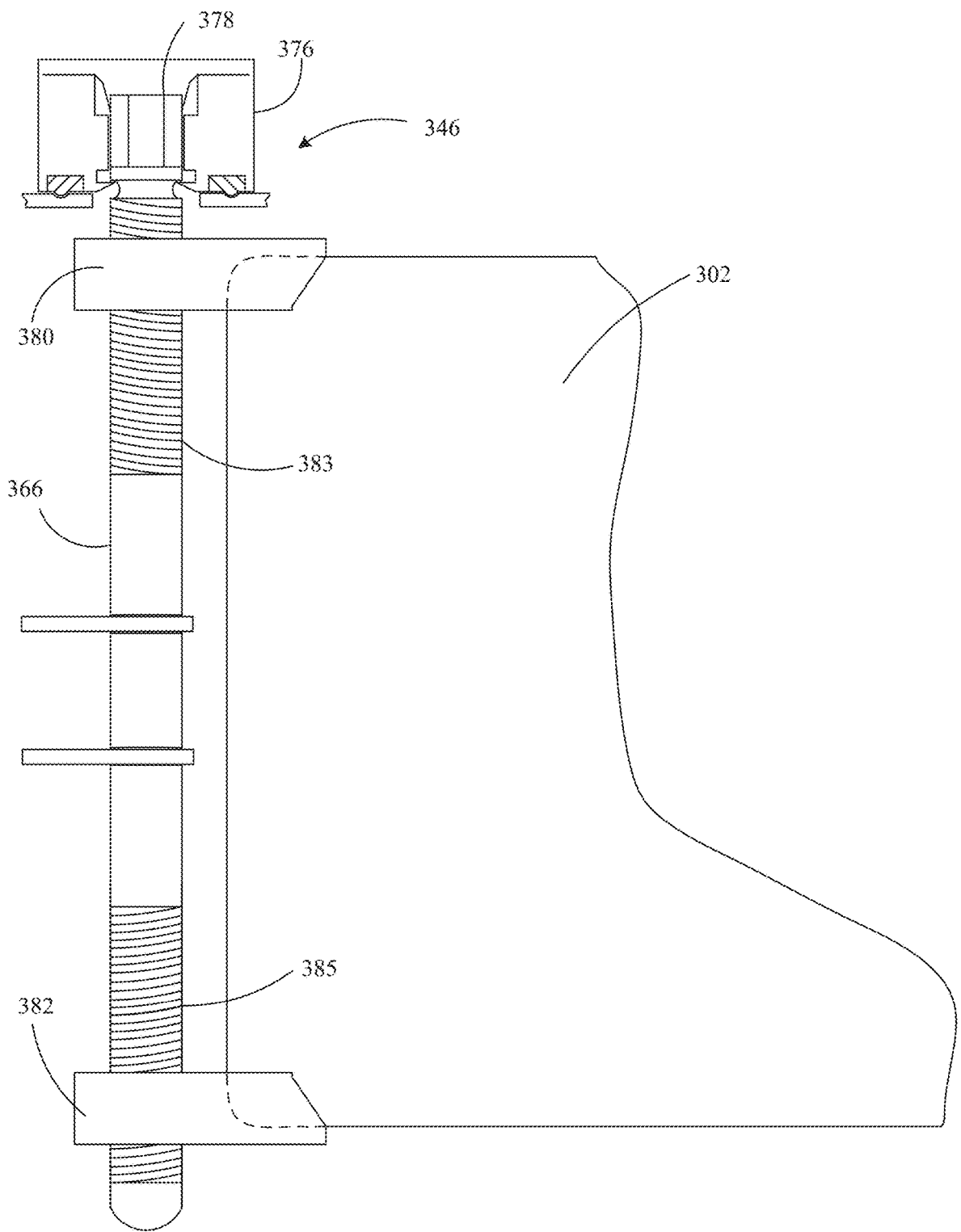
FIG. 15 illustrates a front view in elevation of the third embodiment of the video gaming system of FIG. 9, revealing a pair of retention clips engaged with the clamp shaft, said retention clips mitigates vertical displacement of the clamp shaft relative to the computing device while said retention clips facilitating rotation of the clamp shaft relative to the computing device.

FIG. 12 shows the right-side clamp assembly 344, while FIG. 15 shows the left-side clamp assembly 346, each of which are formed from a common set of components. The common set of components include, but are not limited to, a force translation shaft 366 secured to the right-side input module portion 338 (of FIG. 10), else the left-side input module portion 340 (of FIG. 10), by a retention clip 368 as shown in FIG. 10. The retention clip 368 provides a mounting portion 370 and a securement portion 372 as shown by FIG. 14. The mounting portion 370 is secured to the input module housing (356 or 358), while securement portion 372 interacts with a retention grove 374, which is provided by the force translation shaft 366. The securement portion 372 precludes a vertical translation of the force translation shaft 366, relative to its corresponding input module portion (338 or 340), while promoting rotation of the force translation shaft 366 relative to its corresponding input module portion (338 or 340).

Figure 13:
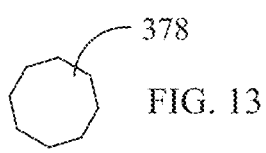
FIG. 13 displays a top view of a head portion of a clamp shaft of the clamp assembly of the third embodiment of the video gaming system of FIG. 9.

FIG. 15 reveals an actuation knob 376 communicating with a multi sided head portion 378 of the force translation shaft 366, and a pair of jaws (380 & 382) communicating with the force translation shaft 366. The pair of jaws (380 & 382) are responsive to a rotational input force applied to the actuation knob 376. The pair of jaws (380 & 382) facilitate attachment of each the right-side input module portion 338, and the left-side input module portion 340 to the computing device 302. A top plan view of an embodiment of the multi sided head portion 378 is shown by FIG. 13.

FIG. 15 further reveals that the force translation shaft 366 presents a left-hand 383 thread on a proximal end and a corresponding right-hand thread 385 on an opposing distal end, such that when a clockwise rotation is applied to said force translation shaft 366, said pair of jaws (380 & 382) advance toward one another thereby closing said pair of jaws (380 & 382) onto said computing device 302, further when a counter-clockwise rotation is applied to said force translation shaft 366, said pair of jaws (380 & 382) retract from one another thereby opening said pair of jaws (380 & 382) from said computing device 302 permitting removal of said corresponding video game control modules (344 & 346 of FIG. 112) from said computing device 302.

FIGS. 16 & 17 show an audio headset 336 includes at least, but not limited to, a right-hand speaker 384 and a left-hand speaker 386, each right-hand and left-hand speakers (384 & 386) are housed within a corresponding right-hand and left-hand speaker housing (388 & 390). In a preferred embodiment, a head band 392 is disposed between and secured to each the right-hand and left-hand speaker housings (388 & 390).

FIG. 17 reveals a power and audio input communication port 394 provided by the right-hand speaker housing 388, else provided by the left-hand speaker housing 390. An audio input/output cable 396 is shown in FIG. 16, whereby the audio input/output cable 396 provides a first connector 398 and a second connector 400, the second connector 400 on a proximal end of the input/output cable 396 and the first connector 398 on a distal end of the input/output cable 396, whereby the first connector 398 interacts with an input/output communication port 402 of FIG. 17, else the second connector 400 interacts with the input/output communication port 402.

FIG. 17 further reveals a combination power and audio input port 404 provided by the right-hand speaker housing 388, else provided by the left-hand speaker housing 390; an energy storage device 406 housed by the right-hand speaker housing 388 else housed by the left-hand speaker housing 390, whereby the energy storage device 406 interacts with the combination power and audio input port 404. FIG. 17 additionally illustrates a charging cable 408 configured for connection to the combination power and audio input port 404 when the energy storage device 406 is charging.

Returning to FIG. 16, shown therein is a microphone 409 configured for connection to: the power and audio input communication port 394 (of FIG. 17); an audio processor 410; and a transceiver device 412. The audio processor 410 and the transceiver device 412 are configured to cooperate with the corresponding processor 306 (of FIG. 9) and the transceiver device 308 (of FIG. 9) of the computing device 302 (of FIG. 9).

Figure 18:
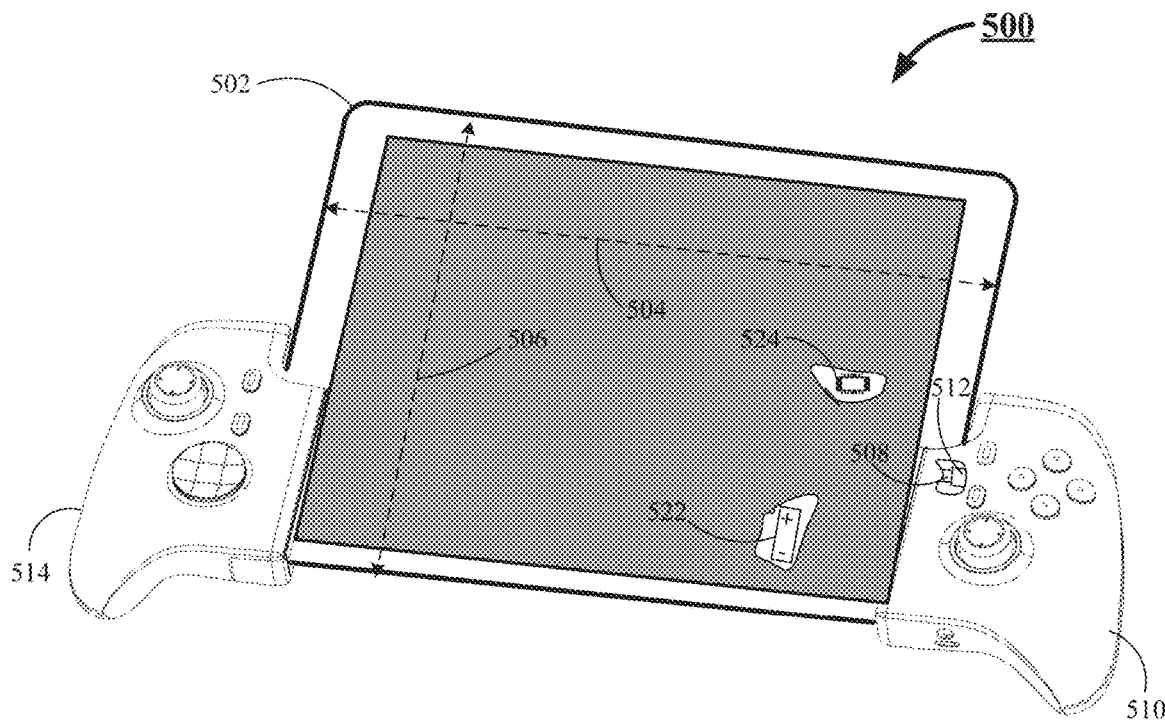
FIG. 18 shows a front view in elevation of a fourth embodiment of a video gaming system.

FIG. 18 shows a mobile video gaming system 500 that includes at least, but not limited to, a computing device 502. The computing device 502 presents a fixed length 504 greater than its width 506, said computing device 502 provides a first combination data/power/audio connector 508. A first video game control module 510 provides a second combination data/power/audio connector 512. The second combination data/power/audio connector 512 is in electronic communication with the first combination data/power/audio connector 508, thereby facilitating passage of data and power and audio signals between said first video game control module 510 and the computing device 502. The mobile video gaming system 500 preferably further includes a second video game control module 514 in electronic communication with the first video game control module 510, and a non-elastic, fixed length, flexible strap ("strap") 516 (of FIG. 19) disposed between and secured directly to each of the first video game control module 510 and the second video game control module 514. In a preferred embodiment, the strap 516 includes two layers of webbing with a power and data conductor 517, sandwiched between the two layers of webbing.

Figure 19:
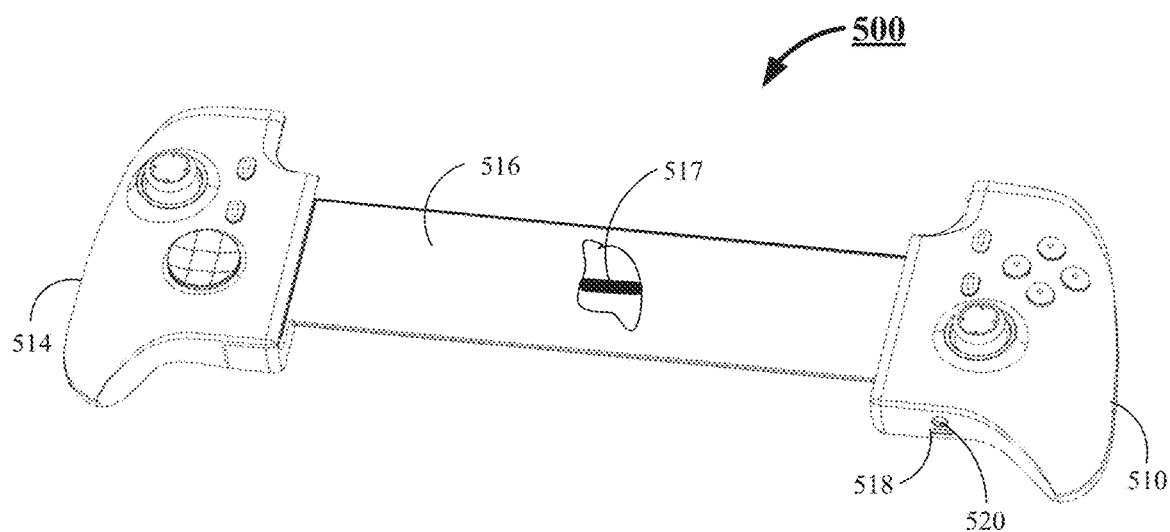
FIG. 19 shows a front perspective plan view of the fourth embodiment of the video gaming system of FIG. 18, revealing a non-ridged, non-stretchable webbing secured to each of the pair of input modules of the video game controller.

FIG. 19 further shows that upon securement of the strap 516 to each the first video game control module 510 and the second video game control module 514, neither the strap 516, nor the first video game control module 510, nor the second video game controller 514 facilitate any adjustment to accommodate a length of a computing device different than the fixed length 504 of the computing device 502.

Continuing with FIG. 19, the first video game control module 510 further provides a power input port 518 and an audio signal port 520. The power input port 518 facilitates transfer of power from an external charger to a battery 522 (of FIG. 18) of the computing device 502 (of FIG. 18), and the audio signal port 520 facilitates transfer of audio signals between an audio processor 524 (of FIG. 18) (such as Cmedia's CM6206 audio codec chip) of the computing device 502 and an external audio device (such as the audio headset 336 of FIG. 16).

Figure 20:
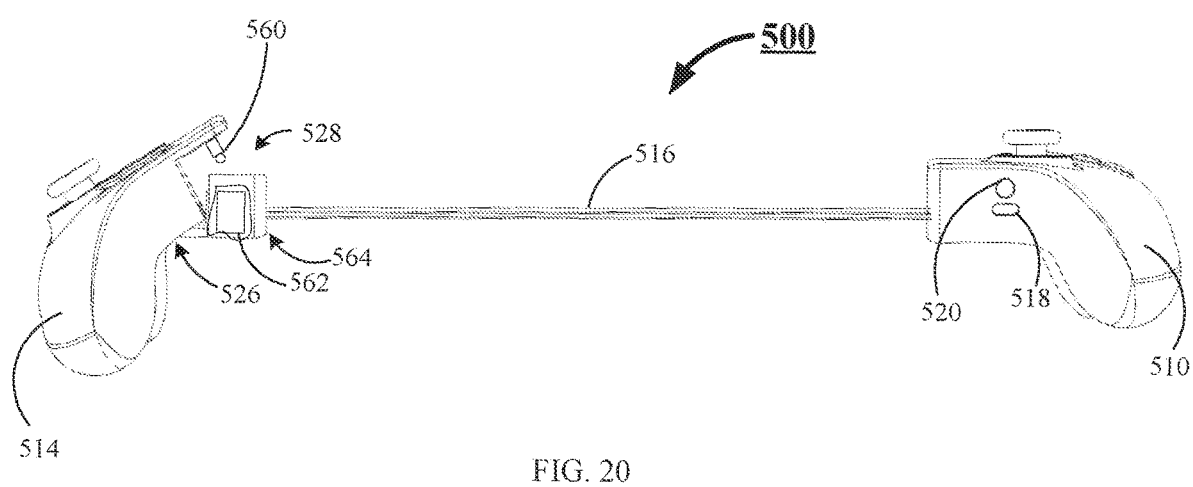
FIG. 20 shows a bottom view in elevation of the video gaming system of FIG. 19, which reveals a hinged hatch provided by at least one of the input modules.
Figure 21:
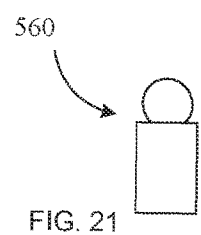
FIG. 21 shows front view in elevation of a ball portion of a ball and receiver latch, provided by at least one of the input modules of FIG. 20, said ball and receiver latch cooperate with the hinged hatch to confine the hinged hatch in a closed position.
Figure 22:
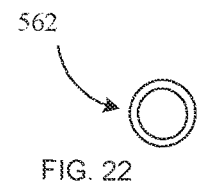
FIG. 22 shows a top plan view of the receiver portion of said ball and receiver latch of FIG. 20.

As shown by FIG. 20, the second video game control module 514 provides a hinged hatch 526 and a latch 528, the hinged hatch 526 interacts with the latch 528. The interaction of the hinged hatch 526 with the latch 528 confines and restrains the computing device 502 (of FIG. 18) within the first video game control module 510 and said second video game control module 514. In a preferred embodiment, the latch 528 includes at least, but is not limited to, two components: a ball 560, which is secured to the hinged hatch 526 and a receiver 562, which is secured to a strap restraint member 564 of the second video game control module 514. FIG. 21 shows a front view in elevation of the ball 560, while FIG. 526 shows a top plan view of the receiver 562.

During operation, a first end of the computing device 502 is slid into position within the first video game control module 510 and the combination data/power/audio connector 508 of the computing device 502 is fully seated into the combination data/power/audio connector 512 of the first video game control module 510, thereby facilitating passage of data, power, and audio signals between said first video game control module 510 and the computing device 502. Ones the first end of the computing device 502 is correctly seated within the first video game control module 510, the second of the computing device 502 is lowered into position in contact adjacency with the strap restraint member 564 and the hinged hatch is manually rotated such that the ball 560 engages the receiver 562. The full engagement of the ball 560 with the receiver 562 locks and secures the computing device 502 between the first and second video game control modules (510 & 514) until the latch 528 is released by the user.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular computing device without departing from the spirit and scope of the present invention.

What is claimed is:

1. A mobile video gaming system comprising:
    a computing device, said computing device presents a fixed length greater than its width, said computing device provides a first combination data/power/audio connector;
    a first video game control module provides a second combination data/power/audio connector, said second combination data/power/audio connector in electronic communication with said first combination data/power/audio connector, thereby facilitating passage of data and power and audio signals between said first video game control module and said computing device;
    a second video game control module in electronic communication with said first video game control module; and
    a non-elastic, fixed length, flexible strap ("strap") disposed between and secured directly to each said first video game control module and said second video game control module, wherein the strap comprises two layers of webbing with the second combination data/power/audio connector sandwiched between the two layers of webbing.

2. The mobile video gaming system of claim 1, in which upon securement of said strap to each said first video game control module and said second video game control module, neither said strap, nor said first video game control module, nor said second video game module facilitate any adjustment to accommodate a length of a computing device different than said fixed length of said computing device.

3. The mobile video gaming system of claim 2, in which said first video game control module further provides a power input port and an audio signal port, said power input port facilitates transfer of power from an external charger to a battery of said computing device, and said audio signal port facilitates transfer of audio signals between an audio processor of said computing device and an external audio device, said second video game control module provides a hinged hatch and a latch, said hinged hatch interacts with said latch to confine and restrain said computing device within said first video game control module and said second video game module.

\* \* \* \* \*